Figure 1:
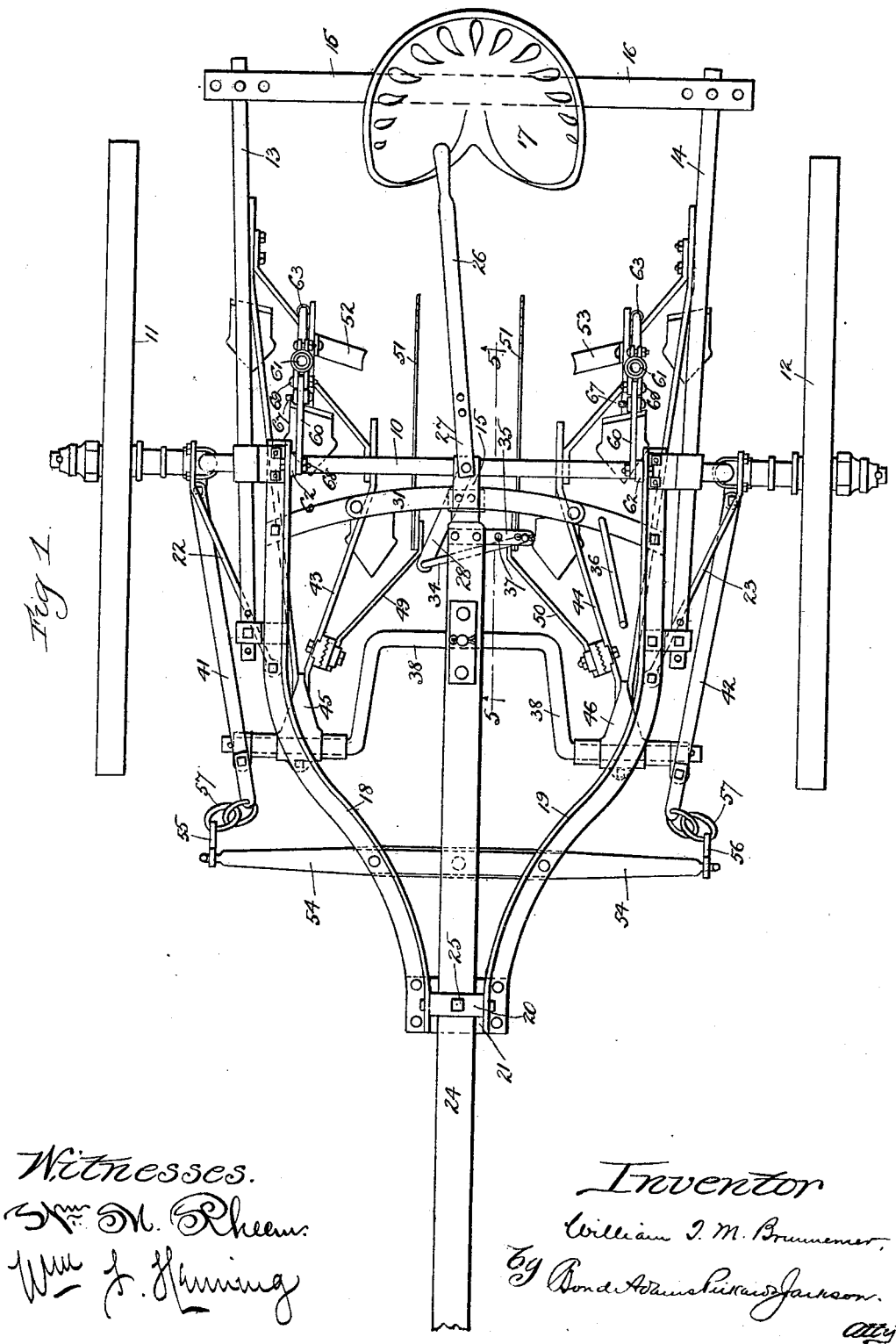

No. 631,415. Patented Aug. 22, 1899.
W. T. M. BRUNNEMER.
CULTIVATOR.
(Application filed Apr. 18, 1898.)
(No Model.) 4 Sheets—Sheet 1.

Witnesses.
Inventor
William T. M. Brunnemer,

No. 631,415. Patented Aug. 22, 1899.
W. T. M. BRUNNEMER.
CULTIVATOR.
(Application filed Apr. 18, 1898.)

(No Model.) 4 Sheets—Sheet 3.

No. 631,415. Patented Aug. 22, 1899.
W. T. M. BRUNNEMER.
CULTIVATOR.
(Application filed Apr. 18, 1898.)
(No Model.) 4 Sheets—Sheet 4.
Fig. 4.
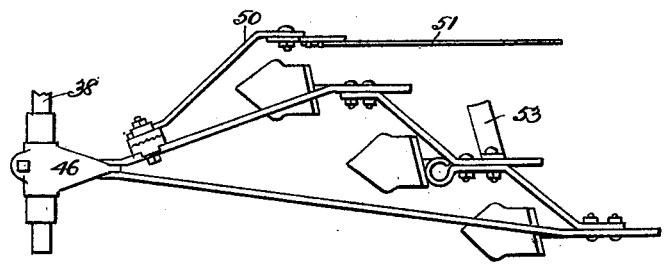
Fig. 5.
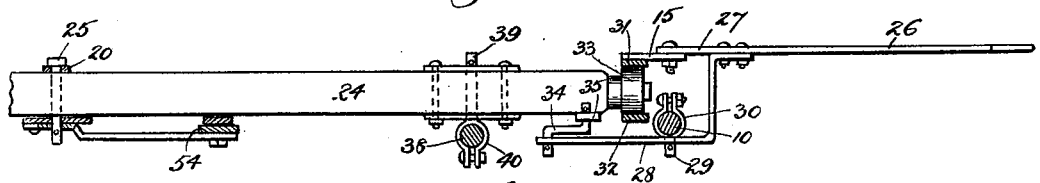
Fig. 6.
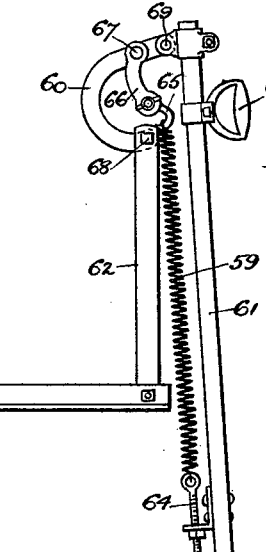
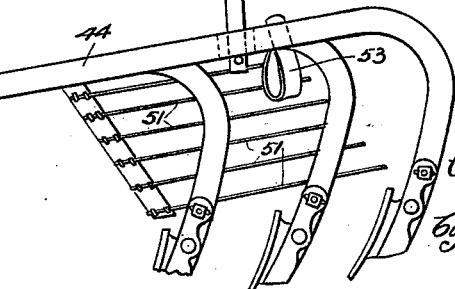
Witnesses
Wm. M. Rheem
Wm. F. Henning
Inventor
William T. M. Brunnemer,
by Bond Adams Pickard Jackson.
Attys

UNITED STATES PATENT OFFICE.

WILLIAM T. M. BRUNNEMER, OF BRADLEY, ILLINOIS, ASSIGNOR TO THE DAVID BRADLEY MANUFACTURING COMPANY, OF CHICAGO, ILLINOIS.

CULTIVATOR.

SPECIFICATION forming part of Letters Patent No. 631,415, dated August 22, 1899.

Application filed April 18, 1898. Serial No. 678,048. (No model.)

*To all whom it may concern:*

Be it known that I, WILLIAM T. M. BRUNNEMER, a citizen of the United States, residing at Bradley, in the county of Kankakee and State of Illinois, have invented certain new and useful Improvements in Cultivators, of which the following is a specification, reference being had to the accompanying drawings.

My invention relates to agricultural implements, and particularly to cultivators in which the shovels are adapted to be moved laterally for the purpose of avoiding plants or obstacles. In machines of this character it has heretofore been customary usually to secure the lateral adjustment of the shovels for the purpose indicated by turning the gangs about a vertical axis lying between the front and rear shovels of the gangs, various constructions being employed to accomplish this result. This form of operation is objectionable, because by so adjusting the gangs it necessarily follows when the forward shovels are adjusted in one direction that the rear shovels of the same gang move in the opposite direction, and although the line of travel is altered it is necessary for the machine to progress a considerable distance before the rear shovels regain the position lost by such adjustment. To avoid the objections incident to such prior construction is one of the principal objects of my present invention, and this I accomplish by providing improved means whereby the gangs may be moved bodily laterally. In the best form of apparatus for securing this result the gangs are connected to the rear portion of the tongue back of the point at which the frame of the carriage is connected thereto, so that by moving the rear end of the tongue laterally not only are the wheels turned angularly to change the line of travel, but the front ends of the gangs are also immediately carried over nearer to one wheel or the other, thus avoiding plants or obstacles which may have been directly ahead of the shovels at the time of making the adjustment. In order to carry the rear shovels laterally at the same time, the gangs are connected by a laterally-rigid connection at their front ends, the result being that the rear shovels also move laterally in the same direction and at the same time as the front shovels of the gang, although owing to the elasticity of the gangs and the angular adjustment of the wheels the rear shovels are not carried as far laterally relatively to the original line of travel as the front ones, thus in effect turning the gangs about a vertical axis lying back of the rear shovels. It has heretofore been attempted to provide for the lateral shifting of the shovels by altering the line of travel of the wheels; but such adjustment does not immediately affect the shovels, as it is necessary for the machine to progress an appreciable distance before the shovels are shifted to any considerable extent. Consequently if the plant or other obstacle be close at hand it is practically impossible to avoid it. By providing, however, for moving the shovels quickly toward one wheel or the other their adjustment is immediately effected, so that plants may be avoided even though they lie immediately in advance of the shovels.

A further object of my invention is to provide means by which the lateral shifting of the gangs may be effected by simply bearing down upon one gang or the other, thereby increasing the resistance of the gang so acted upon and changing the line of draft, which steers the cultivator in the desired direction, thus enabling the operator to quickly and conveniently effect the lateral adjustment desired.

A further object of my invention is to provide spring mechanism for raising the gangs when not in use, which object I accomplish as hereinafter described and as illustrated in the drawings.

What I regard as new will be set forth in the claims.

Figure 2:
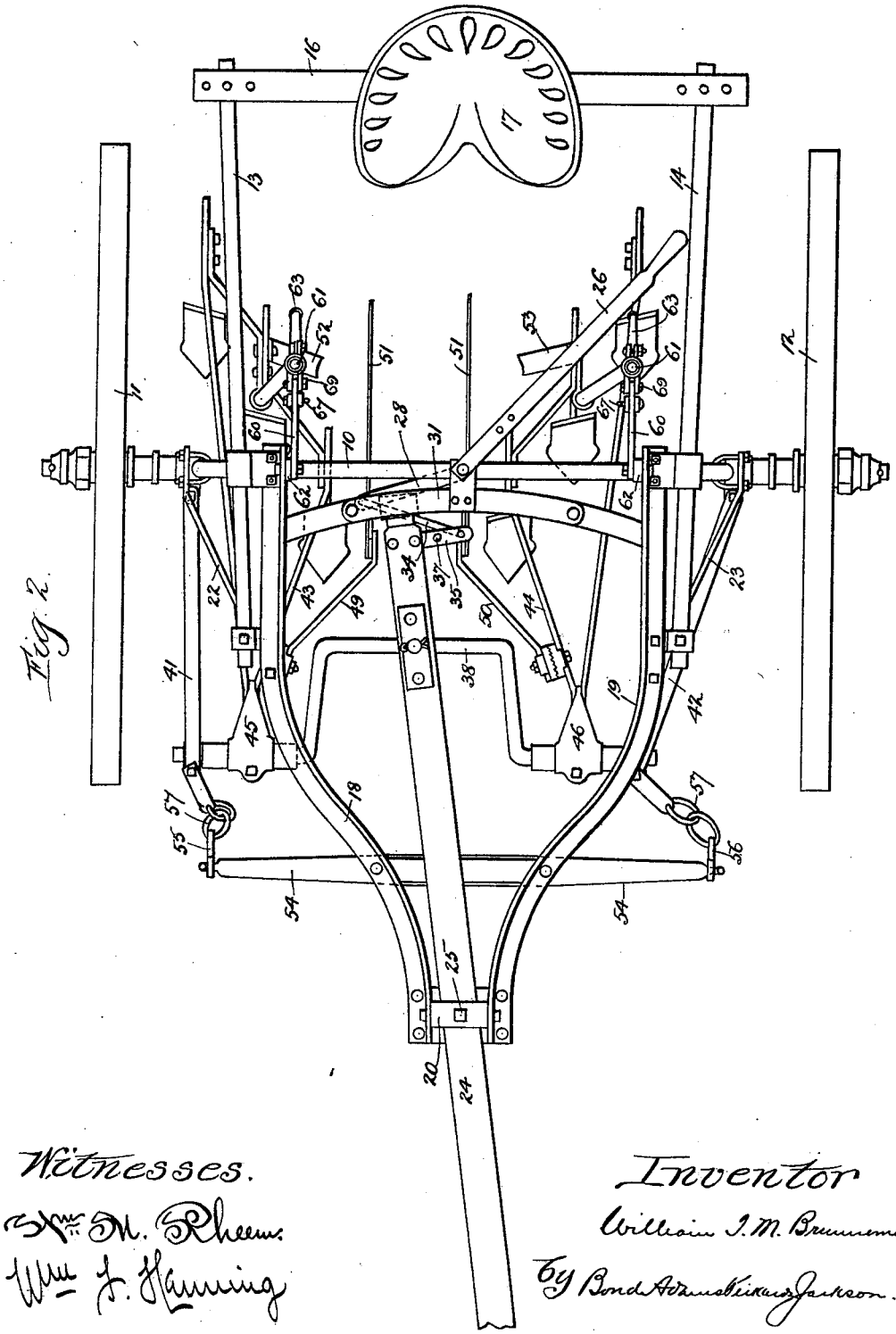
Figure 3:
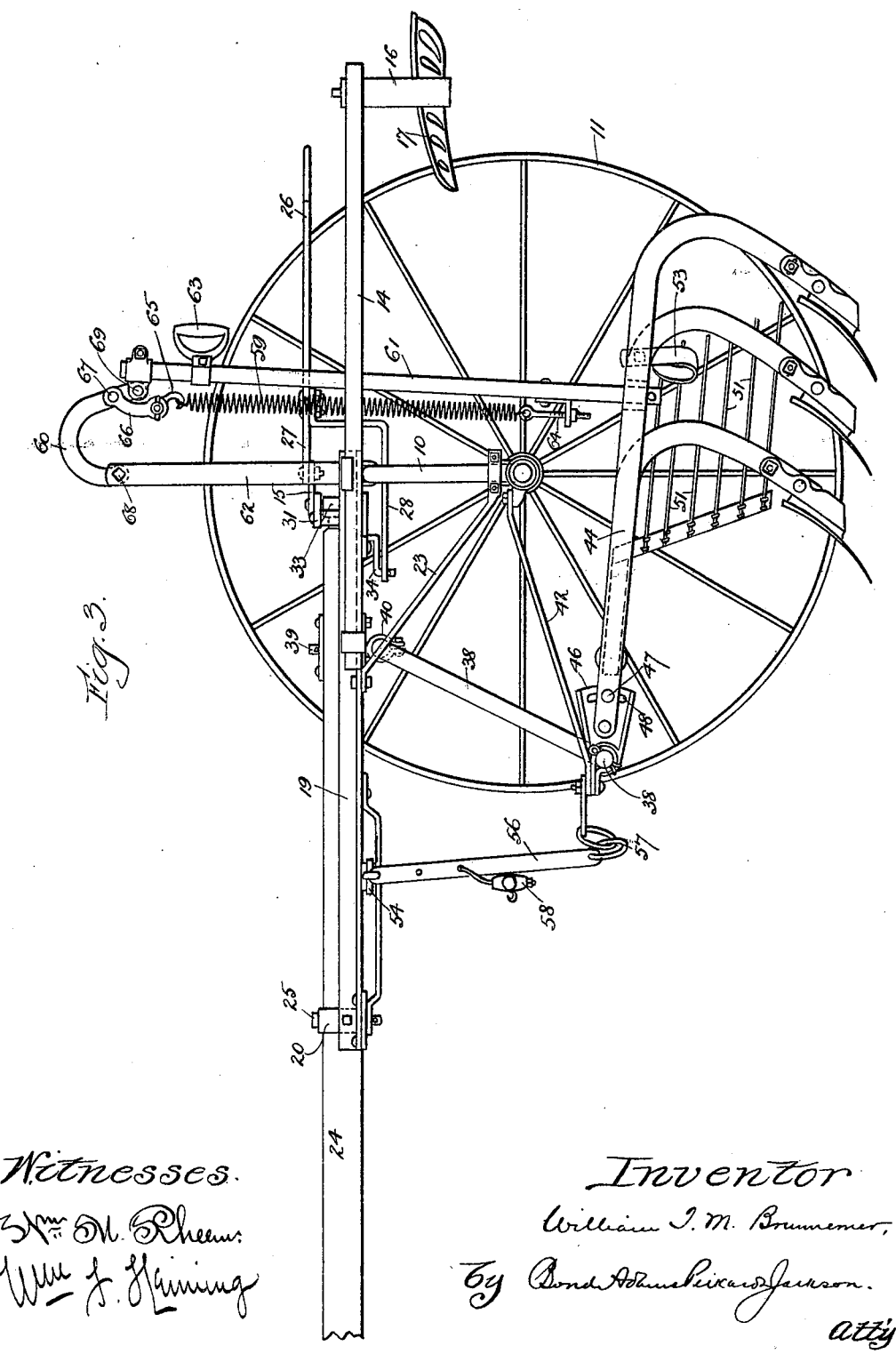

Referring to the accompanying drawings, Figure 1 is a plan view showing the cultivator under normal conditions. Fig. 2 is a similar view showing the carriage turned to an angular position with reference to the tongue. Fig. 3 is a side elevation. Fig. 4 is a plan view of one of the gangs. Fig. 5 is a longitudinal section on line 5 5 of Fig. 1; and Fig. 6 is a detail, being a side view of one of the gangs and the spring lifting devices therefor.

10 indicates the axle of the carriage, which is of the usual arched form and is supported by wheels 11 12.

13 14 indicate the side bars of the carriage-frame, which are secured to the axle 10, as shown in Figs. 1 and 3.

16 indicates the seat-bar, which is secured upon the rear ends of the side bars 13 14 and carries a seat 17, as shown in Figs. 1 and 3.

18 19 indicate fore hounds, which are secured at their rear ends to the axle 10 and to the side bars 13 14, respectively, and at their forward ends are connected by upper and lower cross-bars 20 21, respectively, as shown in Fig. 1.

22 23 indicate braces connecting the lower ends of the axle 10 with the members 18 19 of the fore hounds, as shown in Figs. 1 and 3.

24 indicates the tongue, which extends between the cross-bars 20 21, to which it is pivoted between its ends by a pivot 25, as shown in Fig. 1, by which construction the carriage and tongue are made angularly adjustable with relation to each other.

26 indicates a hand-lever, which is bifurcated, as shown in Figs. 3 and 5, having upper and lower members 27 28, respectively. The lower member 28 of the lever 26 is pivoted to a pivot 29, secured by a clip 30 or in any other suitable way to the axle 10, as shown in Fig. 5. The upper member 27 of the lever 26 is pivoted to a suitable supporting-bar 15, which is in turn connected to an upper guide-bar 31, secured upon a lower guide-bar 32, which is curved and is connected at its ends to the rear ends of the members 18 19 of the fore hounds, as shown in Fig. 1. As shown in Fig. 5, the guide-bars 31 32 are spaced apart sufficiently to receive a roller 33, carried at the rear end of the tongue 24, said bars serving to support and guide the rear end of the tongue when the carriage is shifted angularly with relation thereto. As illustrated in Figs. 1 and 2, the lower member 28 of the lever 26 is bent at an angle to the main portion thereof and is connected by a link 34 to an arm 35, secured to the rear end of the tongue 24, as shown in Figs. 1 and 2. By this construction by moving the lever 26 to the right or left the carriage may be correspondingly adjusted angularly with reference to the tongue, thereby turning the wheels in one direction or the other and causing the cultivator to run to one side or the other.

When it is desired to lock the cultivator frame and tongue together to secure the effect of a stiff-pole cultivator, it may be accomplished by means of a locking-bar 36, which is pivoted at one end upon the guide-bar 32, as shown in Fig. 1, and is provided at its opposite end with a hook adapted to enter a hole 37 in the bar 35, thereby locking said members rigidly together.

38 indicates a front arch, which is pivotally secured to the rear portion of the tongue 24 by a pivot 39, carried by a clip 40, which embraces said axle, as shown in Fig. 5. The arch 38 is connected at its ends by pivoted push bars or links 41 42 to the ends of the arched axle 10, as shown in Figs. 1 and 2.

43 44 indicate cultivator-gangs, which are secured to the ends of the front arch 38 and are adapted to rock in a vertical plane, being secured to segments 45 46, which are pivoted upon the ends of the front arch 38. The gangs 43 44 are, however, fixedly secured to the segments 45 46, so that they do not swing laterally independently of the arch 38. The gangs may be adjusted vertically with reference to the segments 46 by reason of the fact that they are secured to such segments by bolts 47, passing through segmental slots 48 in said segments, as shown in Fig. 3.

49 50 indicate shields or fenders, which are secured to the gangs 43 44, respectively, on the inner sides of said gangs, said fenders consisting of a series of separated bars 51, as shown in Figs. 3 and 6. By thus constructing the fenders they act to sift the dirt thrown by the cultivator-shovels, permitting the finer particles to cover the corn or other plant, but preventing the lumps from striking the plant. The gangs 43 44 are provided, respectively, with foot-rests 52 53, as shown in Figs. 1 and 3, so that the operator may use his foot for the purpose of shifting the gangs laterally. It will be noted that the gangs do not swing laterally independently of the front arch 38 or of each other. When the operator presses down on either gang, the increased resistance of the gang so pressed down produces an inequality of draft between the gangs and upon the carriage at opposite sides of the tongue and its pivot 25. Consequently that side of the carriage at which the resistance is less moves forward unimpeded, while the other side is retarded, causing the carriage to swing toward the retarded side and to assume an angular position with reference to the tongue, turning about the pivot by which it is connected to the tongue. This throws the rear end of the tongue toward the retarded side of the carriage, and consequently carries the front arch and gangs in the same direction, and as said arch is nearer the rear end of the tongue than the pivot 25, by which the frame is connected thereto, inasmuch as the rear end of the tongue moves through the greatest arc, the front of the tongue constituting the pivotal point about which the tongue swings, said arch is carried a greater distance and moves more rapidly than the front end of the carriage-frame, and the front ends of the gangs are moved quickly toward one wheel or the other regardless of whether or not the wheels advance, thus giving the quick action necessary to enable the operator to dodge plants and obstacles.

By reason of their support from the rear by pivoted push bars or links 41 42 the movement and response by the wheels and arch in changing the direction of the gangs are quickened, and the gangs are more easily held in their changed position than they would be if draft instead of push links were used.

54 indicates a cross-head which is secured to the tongue and fore hounds and is provided with depending bars 55 56, as shown in Figs. 1 and 3. The bars 55 56 are connected at their lower ends by chains 57 or other flexible connecting devices to the forward ends of the links 41 42, respectively, and to the ends of the front arch 38, as shown in Figs. 1 and 3.

58 indicates the singletrees, which are connected to the depending bars 55 56, as illustrated in Fig. 3. The singletrees may be adjusted vertically, as desired, by providing any desired number of holes in the bars 55 56.

By the construction above described the operator may adjust the carriage to an angular position with reference to the tongue and quickly shift the gangs laterally in either direction by simply bearing down upon the gang at the side toward which he wishes the gangs to move, and as downward pressure upon the gangs may be much more easily exerted than lateral pressure, as in prior constructions, the labor of guiding the gangs is greatly diminished by my improvements, as well as the efficiency of the machine increased.

As already suggested, to secure the effect of a stiff-pole cultivator the pole and carriage may be locked together by the link 36.

The gangs are lifted when not in use by springs 59, acting through curved levers 60 and suspension-bars 61, pivoted thereto. As shown in Figs. 3 and 6, the curved levers 60 are supported upon standards 62, rising from the frame of the machine, being pivoted upon the upper ends of such standards in such manner as to swing backward and forward. The suspension-bars 61 are secured at their lower ends to the gangs 43 44 and at their upper ends are pivoted to the free ends of the curved levers 60. Said bars are provided with handles 63, by which they may be thrown backward to rock the curved levers 60 when desired. The lower end of each spring 59 is connected to an adjustable bolt 64, which is secured to the bar 61 near its lower end, and the upper end of each of said springs is secured by a hook 65 or other suitable device to an arm 66, secured by a pivot 67 to the curved lever 60 near its outer end. It will be noted from an inspection of Fig. 6 that the arrangement is such that when the cultivator-gang is in its upper position the pivot 67, the hook 65, and the pivot 68, which connects the lever 60 to the standard 62, are almost in line with the bolt 64, so that the weight of the gang has little, if any, tendency to rock the lever 60. At the same time the pivot 69, which connects the upper end of the rod 61 with the lever 60, does not lie between the pivot 67 and the bolt 64. The spring 59 is therefore relaxed. When, however, the operator draws back the rod 61, the pivot 67 and bolt 64 move over out of line with the pivot 68, the weight of the gangs consequently becoming more effective; but at the same time the pivot 69 is carried down between the pivot 67 and the bolt 64, expanding the spring, as illustrated in Fig. 3, so that its tension acts to support the weight of the gang. The result is therefore that the gangs are suspended by the rods 61 from the carriage, and all or the greater part of the weight of the gangs is carried by the springs when the shovels are down nearly to operative position, as well as when they are raised, relieving the operator from the labor of lifting any substantial weight.

It should be understood that I do not restrict myself to the specific details of the construction herein shown and described, except in so far as such specific features have been particularly claimed, as various modifications may be made without departing from my invention.

That which I claim as my invention, and desire to secure by Letters Patent, is—

1. In a cultivator, the combination of a tongue, a carriage, means pivotally connecting the tongue between its ends with the carriage, an arch connected to the tongue back of the pivotal point of the tongue and carriage, one or more furrow-openers connected with the arch, and pivoted links connected at their forward ends to said arch and at their rear ends to the carriage-axle, substantially as described.

2. In a cultivator, the combination of a tongue, a carriage having a forwardly-extending frame, means connecting the tongue with said frame near its front end, an arch connected with the tongue back of the pivotal point of the tongue and frame, furrow-opener gangs connected with said arch, and pivoted links connecting at their rear ends to the carriage and at their forward ends to the arch, substantially as described.

3. In a cultivator, the combination of a tongue, a carriage, means pivotally connecting the tongue between its ends with the carriage, a rigid arch connected to the tongue back of the pivotal point of the tongue and carriage, and furrow-opener gangs having a laterally-rigid connection with said arch, whereby lateral movement of the arch carries the gangs bodily laterally, substantially as described.

4. In a cultivator, the combination of a carriage, a tongue pivotally connected between its ends to the said carriage, an arch connected to the rear portion of the tongue, gangs connected with said arch, an arched axle and links connecting said first-mentioned arch and the arched axle, substantially as described.

5. In a cultivator, the combination of a carriage, a tongue pivotally connected between its ends to said carriage, means connected to the rear portion of the tongue for angularly adjusting the carriage with reference thereto, an arch connected to the rear portion of said tongue, gangs connected with said arch, an arched axle and links connecting said first-mentioned arch and the arched axle, substantially as described.

6. A cultivator having a tongue, a carriage and cultivator-gangs, the carriage being angularly adjustable with reference to the tongue to vary its line of travel, the cultivator-gangs being arranged to move laterally more quickly than the wheels, when the latter are adjusted to change the line of travel, substantially as described.

7. In a cultivator, the combination of a tongue, a carriage, means adjustably connecting the tongue and carriage whereby the carriage may be turned to an angular position with reference to the tongue; an arch pivotally connected to the tongue back of the point of connection of the tongue and carriage, furrow-opener gangs connected with said arch and links connecting the said arch and the carriage, substantially as described.

8. In a cultivator, the combination of a tongue, a carriage, means adjustably connecting the tongue and carriage whereby the carriage may be turned to an angular position with reference to the tongue; an arch pivotally connected to the tongue back of the point of connection of the tongue and carriage, furrow-opener gangs connected to said arch by laterally-rigid connections, and links conecting the said arch and carriage, substantially as described.

9. In a cultivator, the combination of a tongue, a carriage, means adjustably connecting the tongue and carriage whereby the carriage may be turned to an angular position with reference to the tongue, an arch pivotally connected to the tongue back of the point of connection of said tongue and carriage, furrow-opener gangs connected to said arch, links connecting said arch and the carriage, and suspension devices supporting the gangs from the carriage, substantially as described.

10. In a cultivator, the combination with a carriage and a steering device as a tongue, of furrow-opener gangs connected with the tongue, and means operated by unequal resistance of the gangs for causing the gangs to run to one side or the other, substantially as described.

11. A lifting device consisting of a swinging lever mounted upon a suitable support, a rod pivotally connected with said lever, said rod being also connected with the object to be lifted, and a spring connected at one end with said lever between the fulcrum thereof and the point at which it is connected to said rod, and at the other end with said rod, the points at which said spring is connected with said lever and rod being arranged to move substantially into line with the pivot connecting said rod and lever, substantially as described.

12. A lifting device, consisting of a bent lever mounted upon a suitable support, a bar pivoted to said lever at or near the end thereof and connected to the object to be lifted, and a spring connected to said lever between its ends and to said bar, substantially as described.

13. A lifting device, consisting of a bent lever pivotally mounted upon a suitable support, a bar pivoted to said lever at one end thereof and connected to the object to be lifted, and a spring pivotally connected to said lever between its ends and to said bar, the pivots of said lever and spring being movable substantially into line with the point at which the spring is connected to said bar, when the spring is relaxed, substantially as described.

14. A lifting device, consisting of a swinging lever mounted upon a suitable support, a rod pivotally connected with said lever, said rod being also connected with the object to be lifted, a swinging arm 66 pivotally connected to the lever between the fulcrum thereof and the point at which it is connected to said rod, a spring connected at one end to said swinging arm, and at the other end with said rod, the pivot of said arm being movable substantially into line with the pivot connecting said rod and lever, and with the lower end of the spring, substantially as described.

15. In a cultivator, the combination of a wheeled carriage, a furrow-opener gang movable bodily toward one of the wheels, and means for angularly adjusting the carriage-wheels, substantially as described.

16. In a cultivator, the combination of a wheeled carriage, a furrow-opener gang movable bodily toward one of the wheels, and means for angularly adjusting the carriage-wheels simultaneously with the lateral adjustment of the gang, substantially as described.

WILLIAM T. M. BRUNNEMER.

Witnesses:
JOHN L. JACKSON,
CHARLES E. PICKARD.